United States Patent [19]

Parmenter

[11] Patent Number: 5,129,468

[45] Date of Patent: Jul. 14, 1992

[54] METHOD AND APPARATUS FOR SEPARATING DRILLING AND PRODUCTION FLUIDS

[75] Inventor: Allan S. Parmenter, Houston, Tex.

[73] Assignee: Conoco Specialty Products Inc., Houston, Tex.

[21] Appl. No.: 796,877

[22] Filed: Nov. 25, 1991

Related U.S. Application Data

[63] Continuation of Ser. No. 649,382, Feb. 1, 1991, abandoned.

[51] Int. Cl.$^5$ .......................... E21B 21/06; E21B 7/04
[52] U.S. Cl. ........................ 175/66; 175/206; 175/207
[58] Field of Search ................ 175/66, 206, 207; 166/267, 265; 55/36, 46, 159; 210/787, 803, 804, 806, 97

[56] References Cited

U.S. PATENT DOCUMENTS

| | | | |
|---|---|---|---|
| 3,016,962 | 1/1962 | Lummus et al. | 175/66 |
| 3,500,943 | 3/1970 | Bingman, Jr. | 175/66 |
| 4,192,392 | 3/1980 | Messines et al. | 175/66 |
| 4,666,471 | 5/1987 | Cates | 175/66 X |
| 4,725,362 | 2/1988 | Dugat | 175/66 X |
| 5,010,966 | 4/1991 | Stokley et al. | 175/66 |

*Primary Examiner*—Stephen J. Novosad
*Attorney, Agent, or Firm*—John E. Holder

[57] ABSTRACT

In a drilling system where production fluids are produced during the drilling operation, a brine solution is used to prevent development of a filter cake on the formation and thereby in the absence of such filter cake, allow production to occur. A separation system at the surface separates out the gas component of the produced fluids, the fluidized particulate drill cuttings, and produced oil, to return a reusable drilling fluid to the system, which drilling fluid is substantially depleted of hydrocarbons so as to make the fluid usable. The separation system uses a hydrocyclone for processing an oily water phase to thereby minimize the complexity and cost of the oil/water separation portion of the drilling fluids system.

29 Claims, 2 Drawing Sheets

METHOD AND APPARATUS FOR SEPARATING DRILLING AND PRODUCTION FLUIDS

This application is a continuation of U.S. Patent Application Ser. No. 07/649,382, filed 01 Feb. 1991, now abandoned.

BACKGROUND OF THE INVENTION

This invention relates to a method and apparatus for separating fluids in a drilling fluids system and more particularly separating water and oil phases of the fluids wherein oil is produced from earth formations into the drilling fluids.

In the drilling of horizontal boreholes into earth formations, problems different than those in conventional drilling operations are encountered with respect to drilling the formations, and particularly with respect to the drilling fluids system. One purpose for drilling horizontally into a formation is to increase the surface area of the producing formation which is exposed to a production flowpath. In a standard drilling operation the drill pipe passes through the formation to be produced in a substantially perpendicular fashion. Thus, the surface area of the formation that is exposed to the production pipe is typically the thickness of the formation. Where the completion is made horizontally through the formation, the surface area of the production zone is only limited by the pratical length at which drilling can be extended horizontally into a formation. In addition, such wells are sometimes drilled into consolidated formations wherein casing is not used in the completion, thus the production is by way of an open hole into a production pipe string. This being the case, any hydrocarbon fluids in the formation being drilled are of course exposed to the wellbore that is penetrating through the formation. In order to prevent or minimize formation damage as the drilling operation is taking place, it is preferred not to use a drilling mud containing materials that will penetrate into the formation or cake over the formation to thereby limit production from the formation during or after the drilling operation. Typically, drilling fluids contain granular solid material that when mixed with water forms a clay cake on the formation face penetrated by the wellbore. In the typical drilling operation, casing is cemented into the hole over this caked face and then a perforating operation is performed which opens holes through the casing, cement, cake face, and into the formation to expose formation to the wellbore and thereby provide a communication path for formation fluids into the wellbore to produce the well. In horizontal drilling operations a water or brine solution is sometimes used as a drilling fluid to prevent damage to the formation. These drilling fluids are generally of a lower density than the typical drilling muds and at the same time do not form a substantial filter cake on the wellbore. The lower density of the fluid produces a pressure underbalance so that any hydrocarbon fluids in the formation, particularly those under pressure, will produce into the wellbore and become entrained in or mixed with the drilling fluids therein. It has been found that it is possible to produce these formation fluids into the drilling fluids and recover them at the surface for subsequent sale of the produced hydrocarbon fluids. If a substantial amount of such hydrocarbon fluids are produced during the drilling operation, this has the possibility of being a favorable economic situation, thus making it desirable to produce the hydrocarbon fluids and to provide a separation process at the surface which will permit the sale of such produced fluids.

In the typical drilling fluids system used in vertical wells we refer to the drilling fluid system as being a balanced system when the weight of the drilling fluids is such that it prevents substantial intrusion of formation fluids into the wellbore as it is being drilled i.e, the drilling fluid density, hydrostatic pressure and pump pressure are balanced as a system with the formation pressure. If the pressure rises in the formation the density of the drilling fluids is increased to compensate for this rise in pressure and thereby maintain the balance. In a well, such as a horizontally drilled well, where fluids are purposefully being produced, the drilling fluid system is run in an underbalance condition to allow the formation fluids to flow into the wellbore. This is sometimes called "going live" in drilling jargon. The choke manifold at the surface is opened to permit pressure on the formation to be reduced which in turn lets the formation flow. Thus in horizontal drilling under the above circumstances, we are interested in minimizing caking or damage to the wellbore, producing fluids during drilling, recovering as much of the produced fluids as possible to provide a revenue during the drilling operation period, and maintaining control of the density of the drilling fluids so that the drilling fluid density is sufficiently low to permit production and at the same time heavy enough to maintain well control as to prevent the formation pressure from caving in the borehole blowing out the well.

The problems presented by this present drilling system, with respect to producing hydrocarbons during the drilling operation, have to do in one important respect with the gravity separation methods that are presently used to separate oil and water. An extensive amount of tankage is required to accommodate the drilling fluids and produced hydrocarbons in order to provide sufficient separation to recover clean production fluids and at the same time remove a sufficient amount of the hydrocarbons from the drilling fluid to maintain its density at a usable level. The hydrocarbons are normally less dense than the drilling fluids and therefore if very much hydrocarbon fluid is left in the drilling fluids after separation and before recirculation, the density of the drilling fluids is adversely affected. Therefore, the efficiency of oil removal from the circulated drilling fluids is a critical issue in these systems using the present gravitational separation methods. Another factor that is addressed with the present invention in addition to separation efficiency and economics of producing hydrocarbons during drilling, is that of safety. One safety issue is the control over drilling fluid density which has to do with the prevention of blowouts and wellbore cave-in. In these systems, the system pressure is borne by portions of the separation system. When you are drilling with an unbalanced system "gone live", the control of fluid density versus formation pressures becomes more cirtical and accurate control of hydrocarbon fluids in the drilling fluids is very important. More careful control of fluid density can minimize the complexity of process control within the system. In additon, in a gravity oriented system, there is often a number of residence tanks vented to the atomsphere which are holding fluids containing hydrocarbons. One of the more compelling factors for improving the prior separation systems is the capitol costs and logistics involved in the extensive tankage, lines, controls, etc.

involved in the gravity system in addition to separation efficiency and the inherent safety improvements resulting from a simpler system.

It is therefore an object of the present invention to provide a simpler, more efficient, and less costly method and apparatus for dealing with the problem of separating drilling fluids from production fluids in a well being drilled into a producing formation. In addition, it is an object to provide a safer system and one which will reduce costly rig up and rig down time when the drilling location is changed. When such horizontal drilling operations are conducted offshore, it becomes a further object to provide simplified systems from a space saving standpoint which also meet the enhanced requirements for safety in offshore operations.

SUMMARY OF THE INVENTION

With these and other object in view it is the purpose of the present invention to provide a separation system for receiving drilling fluid materials which are circulated from a wellbore and contain hydrocarbon fluids from a drilled formation to form a mixture of materials comprised of drilling fluids, drill cuttings in the form of particulate matter, and produced hydrocarbon fluids having gas and liquid components. The received fluids are passed into the separation system where at least a portion of the gas is liberated and where liquid components of the mixture are at least initially separated into oil and water components. The initially separated water component contains other residual components of the wellbore drilling fluid materials and this combined water and residuals component is then passed to a hydrocyclone for further outlets an underflow outlet of the hydrocyclone and is passed either back into a drilling fluids system or is passed to separation devices for additional separation. Solids or particulate matter in the drilling fluid materials may be at least partially removed in the separation system for initially separating oil and water components. These removed solids may then be passed to further separation means for additional separation.

DESCRIPTION OF THE PREFERRED EMBODIMENT

Figure 1:
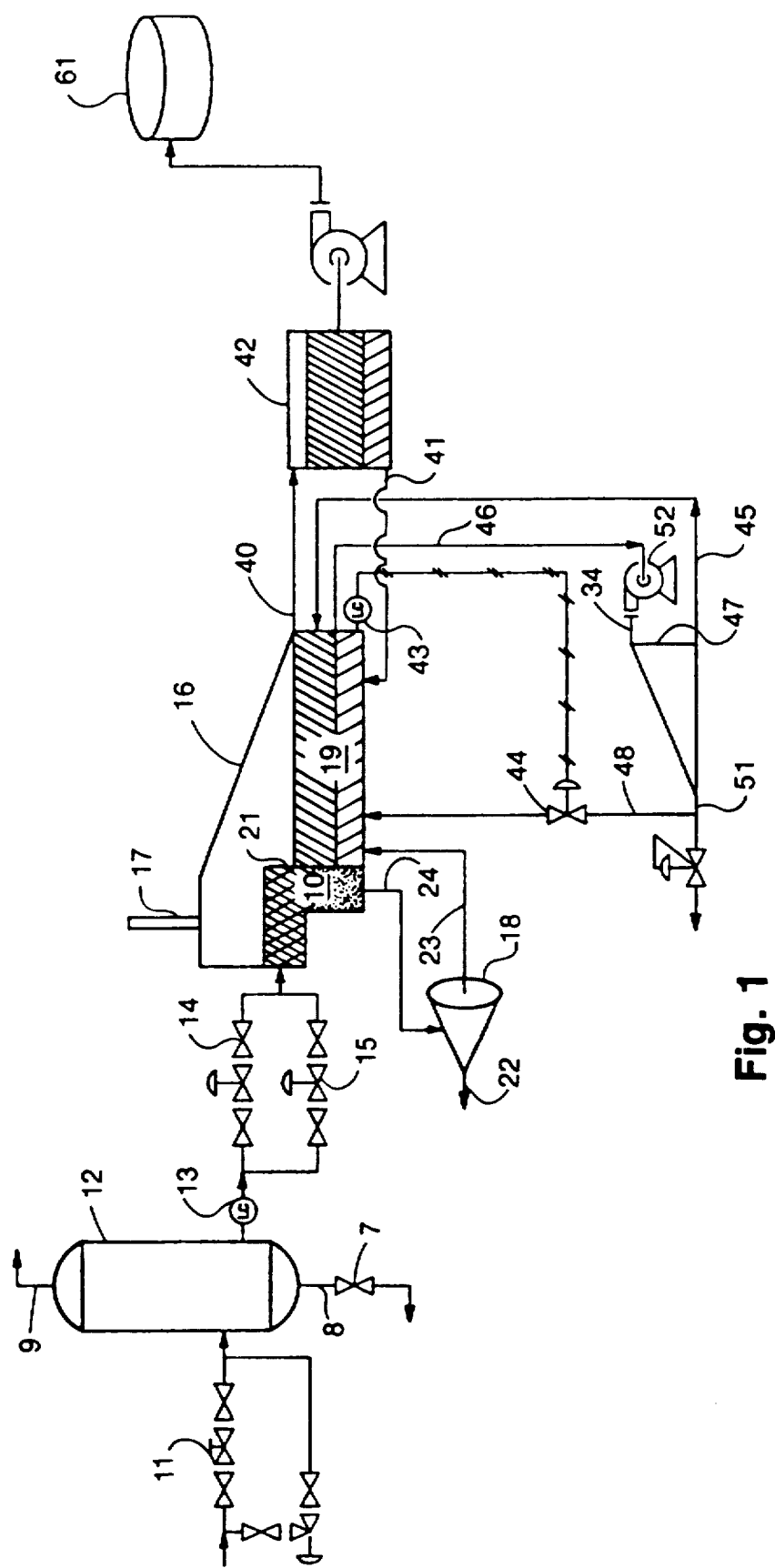
FIG. 1 is a schematic drawing of a separation system in accordance with the present invention for separating components of a drilling fluids system.

One embodiment of the present system is shown schematically in FIG. 1 of the drawings. So called dirty fluids are circulated from the well which is being drilled into a choke manifold system 11. These dirty fluids are made up of fresh water or brine drilling fluids, drill cuttings, and produced hydrocarbons from formations penetrated by the drilling operation. In normal drilling operations, formation fluids are prevented from producing into the borehole of the well by the density of the drilling fluid being circulated into the wellbore, by the hydrostatic head, and by pump pressure. By adding solids to the drilling fluid and taking into consideration the depth of the formation and the resulting head of the drilling fluids, these factors affecting density and weight of the drill column are arranged to provide a positive pressure against excepted formation pressure to provide a balanced system. In the present drilling process, the drilling fluids are purposefully unbalanced to develop The Austin Chalk formation, represents one area where horizontal drilling is used to simultaneously drill and produce formations. The produced fluids are hydrocarbons of approximately 30° API crude, salt water, and natural gas. The gas from these formation fluids may be also separated and sold in addition to the liquid hydrocarbons that are produced during the drilling operation. These so-called dirty fluids are passed through the choke manifold 11 to a gas buster, two-phase separator 12. Since the well is being drilled underbalanced, the separator 12 is used to hold a back pressure on the wellbore annulus to control the formation pressure in the well being drilled. The formation pressure can vary over a wide range but in the Austin Chalk field such pressure typically ranges from 3000 to 5000 psi. At the surface, typical pressure at the choke manifold might be 400 to 500 psi. However, under some conditions pressure at the surface can range up to 1500 or 2000 psi, such as when the drilling fluids are being lost into the formation and the annulus is void of drilling fluids.

In a conventional drilling system the choke manifold 11 would be arranged to hold pressure on the formation and reduce the pressure of the drilling fluids exiting the pressured portion of the drilling fluids system at the choke. In the present system, the choke manifold 11 is generallly opened to permit formation pressure to produce the fluids therein, which fluid pressure is passed beyond the choke manifold into the separator 12. This separator 12 is typically spaced away from the drilling rig on a skid together with the choke manifold 11 and other portions of the separation equipment. Thus, in the drilling operation described herein, the pressure from the well being drilled is partially passed into the separator 12 which then serves as the choke on the system. These separator vessels may therefore be capable of withstanding relatively higher pressures such as the ANSI class 600 vessels which will accommodate pressures up to 1480 psi. In the separator 12, most of the gas is liberated from the fluids, which gas can be flared or passed to a gas receiving system for subsequent disposal or sales through the line 9. Also in the separator 12, solids which may be in the from of a fine paste of drill cuttings, such as when driling in chalk, may gravity separate from the fluids to the bottom of the separator. The bottom of the separator 12 is periodally drained through line 8 to allow the solids to pass to a pit or the like for recovery and disposal of these soild fines. A valve 7 permits the line 8 to be opened or closed to flow. A level control 13 near the bottom of the separator 12 opens and closes the valves 14 and 15 which are manual and automated valves respectively to maintain a liquid in the separator 12 to keep gas above the lower level of the separator and thus prevent gas, as much as possible, from moving out into the remainder of the separator system. If the liquid level of separator 12 should fall below a desired level, the liquid level control 13 will close the valves 14 or 15 to permit a buildup of fluids within the separator 12 and thereby keep the gas level at a sufficiently high position in the separator.

The fluids exiting separator 12 are passed through valves 14 and 15 a holding tank 16 which is typically a large portable tank that can be moved easily. The tank 16 is not a pressure vessel normally but is enclosed and has a fan to draw off gas through a stack 17 for venting to the atomsphere. The tank 16 provides a first quiet zone 10 so that any left over solids or fines in the fluids at this point gravity separate to the bottom of the tank 16. The major portion of the solids are usually removed from the drilling fluids in the tank 16. These solids are then pumped or drained from the bottom of tank 16 through line 24 to a solid/liquid centrifuge separator 18 which separates solids from liquids therein, with the solid components from the separator 18 passing to a pit, not shown through underflow outlet 22. Water and oil from the centrifuge 18 are then passed back to an overflow chamber 19 in the tank 16 where they join the oil and water components that spill over the baffle 21 into chamber 19. In the prior art system, these fluids in tank 16 are then passed down an open trough (not shown) to a series of settling tanks which progressively gravity separate the components until a suitable level of separation is reached to (a) return the water component to the drilling system and (b) send the oil component to sales. In the Austin Chalk field where drilling of this sort is being conducted, the sale of hydrocarbons produced during the drilling operation may substantially offset the cost of drilling the well. Thus, not only must the water component be separated to a high quality level for reuse in the drilling system, but likewise the oil component must be passed through a series of settling tanks to reach the degree of purity to permit it to be sold through normal production sales channels. In these prior art systems, the settling tanks for handling the water component have weirs which provide for additional solids removal and also being the first stage of oil/water separation. The weirs in the settling tank are typically in the form of vertical plates which have gaps at the top and the bottom so that oil passes over the top of the plates and water underneath to begin separation of these fluids from one another. Water comes off of the bottom of a tank and passes to an additional settling tank similar to the first tank and so on until the water quality is reached. Oil is taken from the top of each tank and likewise passed to subsequent tanks until a prescribed quality level is reached. If this oil is still wet with water, a tank is arranged so that it can receive chemicals such as demulsifying chemicals to further remove water before pumping the oil to a sales tank 61.

At this point the oil may still be too wet and thus require even further settling. This is determined by contract with purchasers of the oil and their requirements are determined by the economics of shipping or pumping waste fluids and such factors as the lack of separation at the refinery to which they are transported. In any event, meeting these quality requirements may entail a great deal of gravity separation and tankage to provide a sufficiently dry oil for sales. In addition the water phase from this system is eventually deoiled to the extent that it can be recycled to the drilling fluids tanks or pits, not shown, for use in the drilling operation.

Again referring to FIG. 1 of the drawings, the improvement of this invention involves the same steps in the drilling fluid circulation and separation as described above up to passage of the mixture into tank 16. Tank 16 is arranged to control the oil water level of the tank using a level control 43. The top of the oil level in chamber 19 of tank 16 is passed through a line 40 to a settling tank 42 for further separation before pumping to sales represented by the tank 61. Any water taken from the surge tank 42 is passed back to the bottom level of tank 16 by way of line 41. Chemicals can be added to the system at tank 42 to provide additional separation prior to passage of the oil to sales. The water phase from tank 16 passes through line 46 into the inlet 34 of a hydrocyclone 47. An oil phase exits through the reject or overflow outlet 45 of the hydrocyclone and is passed back to the oil layer of the tank 16 to enter the tank at or above the oil level in the tank. This oil phase being separated by the hydrocyclone 47 may be for example in the range of 65% oil and 35% water, but at this point, the oil phase of the stream represents only 1½ to 2% of the total fluid volume of the system. A pump 52 may be provided in line 46 in the system to provide sufficient inlet pressure of fluids entering the hydrocyclone to effect proper separation of the oil and water phases in the mixutre passing into the hydrocyclone. The underflow outlet 51 from the hydrocyclone 47 connects with alternate flow paths. One such path passes through valve 49 to a drilling fluid pit at the drill site to await recirculation in the drilling fluids system. If the level control 43 is calling for recycle of the water stream then this underflow stream passes by way of line 48 through valve 44 back to tank 16 where it enters the tank at or below the water level. This hydrocyclone loop in the system just described eliminates a great deal of tankage and associated lines, transfer pumps and controls from the system as it is presently configured.

The level control 43 on tank 16 operates as follows: as the level of water in tank 16 rises to a predetermined level, the level control closes the recycle valve 44, since enough water is being received with the incoming fluids the well. Thus, the water passing from the tank 16 and separated by hydrocyclone 47 is passed to the drilling fluids tank or pit at the drilling rig. Alternatively, when the water level in tank 16 drops to a predetermined level, the level control 43 opens valve 44 to recycle water from the underflow outlet 51 of the hydrocyclone to the tank 16 and thereby maintain the oil/water interface within a predetermined limited range. In theory, valve 44 will be opened and closed in a throttling fashion, attempting to maintain a relatively constant level within the predetermined range.

Figure 2:
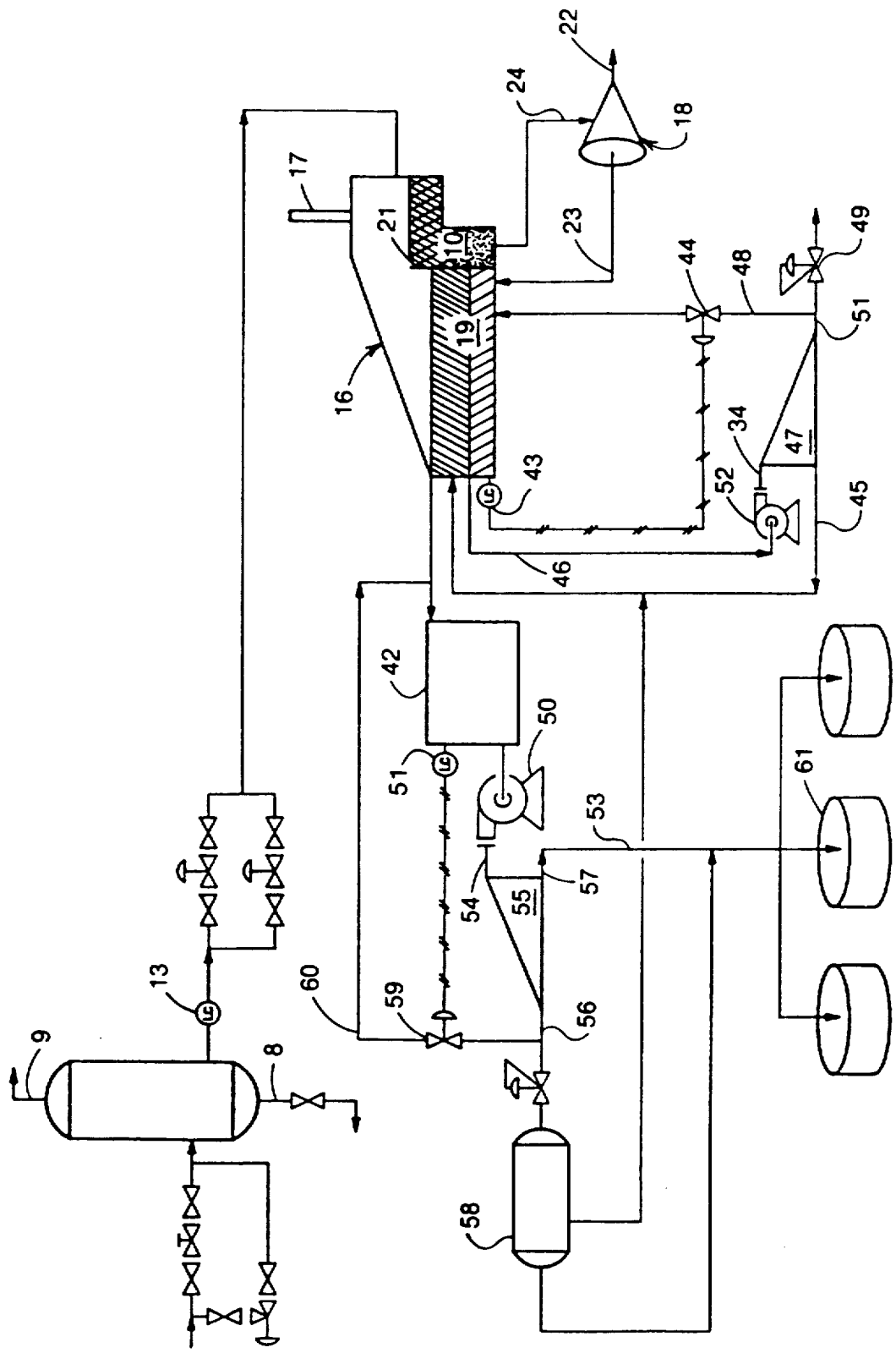
FIG. 2 is a schematic drawing of an alternative separation system for separating components of a drilling fluids system.

Referring to FIG. 2 of the drawings, another embodiment is shown which attends to the oil phase of the system emerging from the hydrocyclone 47 to further treat the oil component of the mixture. The system shown in FIG. 2 is the same up to and through the passage of the oil component from tank 16 to tank 42. At this point additional equipment is shown for dehydrating the oil. This could be the result of particularly difficult separation problems or the high cost of chemical demulsifiers, etc. In this embodiment at a level control 51 is provided on tank 42, and only one outlet line is shown therefrom. Therefore, all of the fluids in tank 42 are pumped by means of pump 50 from the bottom of tank 42 into inlet 54 of a hydrocyclone 55 for dewatering these fluids. Hydrocyclone 55 is of a type especially configured for removing relatively smaller portions of water from larger portions of oil. Such a hydrocyclone is described in U.S. Pat. No. 4,749,490 and is sometimes referred to as a dewatering hydrocyclone. The overflow 57 of the hydrocyclone 55 will be dry and will be passed to oil sales by means of line 53 to tank 61. The underflow 56 of such a dewatering hydrocyclone will most likely be in form of dirty water, i.e. wet with oil. This so called dirty water may be passed to a small heater treater 58 or some other such separation device to further remove water from the oil. Clean oil, from treater 58 is then passed to the sales tank 61. Water from the treater 58 is passed to the oil reject 45 line from the dewatering hydrocyclone 47 for transmission back to the tank 16. This represents a small amount of water at this point. Hydrocyclone 55 takes a substantial workload off the treater 58 so that it can be a much smaller vessel. Level control 51 on surge tank 42 controls a recycle line 58 from the water outlet of hydrocyclone 55 back to the inlet to the surge tank 42 to ensure that there is a constant liquid feed to the pump 50 feeding the hydrocyclone 55. Thus, the level control recycles fluids from the underflow of hydrocyclone 55 if fluids in the tank 42 reach a certain minimum level by activating a valve 59 in the recycle line 58.

In the operation of the apparatus described above in FIGS. 1 and 2 fluids are circulated from a borehole drilling operation into the present system by means of a flow line passing such fluids from the borehole annulus through a choke manifold 11. These fluids are typically comprised of drilling fluids such as brine, water, or the like; drill cuttings; and petroleum fluids which have produced from underground formations into the borehole. These fluids comprising the makeup of drilling fluid system, are then passed into a two-phase separator 12 where a substantial portion of any gas present in the fluids is liberated. This equipment is sometimes called a "Gas Buster". This liberation of gas from the fluids substantially reduces the pressure of the fluids system so that further processing is done at a reduced pressure. Some of the drill cuttings in the fluid system may also separate out in the separator 12 and then removed for subsequent disposal through a line 8 at the bottom of the separator. A level control 13 is operatively connected to an output line from the separator 12 to pass liquids therefrom through a valve system comprised of manual and automated valves 14 and 15. These valves are operated by the level control. These dirty fluids which have now been depleted of most gas and some solids (drill cuttings) are next passed into a large tank 16 where they are received in a first sump or quiet zone 10 separated by a baffle 21 from the main chamber portion 19 of the tank. This first quiet zone serves to separate out a substantial portion of the solids in the form of drill cuttings in the fluids. These solids are then discharged by way of a line 24 to the inlet of a centrifuge 18 which is effective to separate any fluids in the materials dsicharging through line 24 from solids therein. The solids are passed to a pit vessel or the like (not shown) for subsequent disposal. Water or other liquids which are separated in the centrifuge 18 are discharged through the overflow 23 for discharge into chamber 19 in tank 16. Here they are treated with the other fluid components of the fluids system which spill over the baffle 21 into chamber 19. These system fluids are permitted to gravity separate in this chamber so that a predominately water layer develops in the bottom of the chamber 19 with an oil layer on top. The oil layer in the tank 16 passes through an overflow line 40 exiting from the upper portion of chamber 19 which directs the oil component of the fluids to a settling tank 42. The settling tank permits further separation which can be assisted by the addition of chemicals such as demulsifiers. Any water which accumulates in tank 42 is returned by way of a line 41 to the chamber 19 in tank 16 for further processing. Otherwise, the outlet of tank 42 is fed to a pump for transferring the oil to a tank 61 for sale thereof.

The water component in chamber 19 is taken from the tank by way of line 46 and is thus passed to a hydrocyclone 47. A pump 52 may be used to increase pressure on the inlet fluids to that hydrocyclone in order to provide sufficient swirl to effect separation therein. Such a pump can be constructed in accordance with the low shear type pump disclosed in U.S. Pat. No. 4,844,817.

These fluids passing through the hydrocyclone 47 are typically comprised of droplets of oil forming a disperse oil phase in a continuous water phase which separate within the hydrocyclone into the respective phases. The more dense water phase exits the hydrocyclone through the underflow outlet 51. This liquid phase should now be substantially ready for recirculation in the drilling fluids system in that a substantial portion of the oil and solids have now been separated out. The less dense phase is passed through the overflow outlet 45 for return to the tank 19. This overflow stream now represents a small percent of the total volume of fluids in the system. Return of this oil phase to tank 19 could be directed to the sales line if sufficient volume were present. However, this oil phase will likely be dry at this stage and will readily deploy to the surface layer of chamber 19 for subsequent processing of the oil phase passing from tank 16. In the embodiment of FIG. 1, such subsequent processing is shown to be passage of the oil phase by way of line 40 to the settling tank 42 where the materials so admitted are allowed to further separate by gravity, flotation, chemical or physical treatment as needed, to prepare the oil phase for delivery to storage tank 61 for ultimate sale. Any water or other more dense materials will settle to the bottom portion of tank 42 form where such materials may be removed by way of line 41 for return to tank 16. Here they are introduced into a lower level of chamber 19 for integration with the more dense phase therein and thus subsequent treatment and disposal.

In the FIG. 2 embodiment of the system, the less dense phase from tank 16 passes to the settling or surge tank 42 and then is pumped by means of a low shear pump 50 into the inlet 54 of hydrocyclone 55. The overflow outlets 57 of hydrocyclone 55 passes a less dense oil phase through line 53 to storage tank 61 for sale of the oil. The underflow outlet 56 of hydrocyclone 55 passes the more dense water phase from the hydrocyclone separator to alternative flowpaths which are selectively determined by operation of a level control 51 on the settling tank 42. If the level of fluids in tank 42 is sufficient, or exceeds a predetermined level, the outletting material from underflow 56 of hydrocyclone 55 passes to a small heater treater or similar downstream oil/water separator 58. The separator 58 provides any final polish necessary to the more dense phase existing hydrocyclone 55 with the more dense water output of the separator 58 being returned to tank 16 while the oil phase is passed to sales tank 61.

In the further operation of the systems described with respect to FIGS. 1 and 2, the underflow 51 of hydrocyclone 47 outlets a water component which is normally deoiled to the extent that it is reusable in the drilling fluids system. Valve 49 when opened allows passage of this water phase to the drilling fluids system. Flow line 48 provides an alternative flowpath for the fluids passing through the underflow 51. A valve 44 in flowline 48 is operated by a level control 43 to pass fluids from the underflow 51 back to the tank 16. If fluids in chamber 19 of tank 16 fall to a predetermined level, the level control 43 is operated to open valve 44, close valve 49, and thereby pass fluids through line 48 to tank 19.

While particular embodiments of the present invention have been shown and described, it is apparent that changes and modifications may be made without departing from this invention in its broader aspects, and therefore, the aim in the appended claims is to cover all such changes and modifications as fall within the true spirit and scope of the invention.

I claim:

1. In a drilling fluids system for drilling a well wherein a drilling fluid is being circulated into a wellbore and contacting hydrocarbon fluids in earth formation being drilled, with such hydrocarbon fluids producing from the drilled formation into the drilling fluids to form a mixture of materials emerging from the wellbore and comprised of drilling fluids, drill cuttings in the form of fluidized particulate matter, and produced hydrocarbon fluids having gas and liquid components and wherein such mixture of materials emerges from the wellbore under a system pressure which is elevated by the presence of hydrocarbon production from the drilled formation and a relatively low weight drilling fluid, means for separating the component materials in the mixture of fluids to provide a reusable drilling fluid, which means comprises;

separation means having a first stage for receiving the mixture of materials under elevated system pressure and for removing a substantial portion of any gas components in the produced hydrocarbon fluids in the mixture;

said separation means having a second stage for receiving the mixture of materials from the first separation means to separate the fluidized particulate matter and trap such matter for discharge therefrom and for separating liquid fluids into oil and water components, with the separated water component having residual oil therein in sufficient quantities to prevent such water component from being further effectively utilized in the drilling fluids system;

a hydrocyclone separator for receiving said water components from said separation means and for substantially removing such residual oil from said received water component to thereby outlet a water component for reuse as a drilling fluid, and centrifugal separation means for receiving the fluidized particulate matter from said second stage of said separation means to separate drill cutting particulates therefrom.

2. In a drilling fluids system for drilling a well wherein a drilling fluid is being circulated into a wellhole and contacting hydrocarbon fluids in earth formation being drilled, with such hydrocarbon fluids producing from the drilled formation into the drilling fluids to form a mixture of fluids emerging from the wellbore and comprised of drilling fluids, drill cuttings in the form of fluidized particulate matter, and produced hydrocarbon fluids having gas and liquid components, and wherein such mixture of fluids is maintained at a system pressure which is sufficient to prevent formation pressures from blowing out the well, means for separating the component materials in the mixture of fluids to provide a reusable drilling fluid, which means comprises;

separation means for receiving the mixture of materials from the borehole, said separation means arranged to separate gas components of the mixture and pass a substantial portion of such gas components from the mixture, said separation means further being arranged to separate liquids in the mixture into oil and water components, with said water component having residual oil therein to prevent such water from being further utilized in the drilling fluids system as a drilling fluid;

a hydrocyclone separator for receiving said water component from said separation means for substantially removing such residual oil from said received water component and outletting a water component therefrom for reuse as a drilling fluid, and means for directing the outlet water component from said hydrocyclone to the drilling fluids system for use as the drilling fluid.

3. The drilling fluids system of claims 1 or 2 wherein means are provided for maintaining system pressure on such mixture of fluids until a stage of separation is reached whereby gas components of the mixture are removed in a separate flowpath from the oil and water components mixture of fluids.

4. The drilling fluids system of claims 1 or 2 wherein said hydrocyclone has an overflow outlet for outletting residual oil separated from said water component and an underflow outlet for outletting substantially clean water separated from said oil component, and means downstream of said hydrocyclone for alternatively selectively directing said clean water to said separation means or to the drilling fluids system for use as the drilling fluid.

5. The drilling fluids system of claim 4 and further wherein said separation means upstream of the hydrocyclone has level control means for detecting the level of oil and water components therein, and means for operating said selectively directing means in response to said level control means.

6. The drilling fluids system of claim 2 and further wherein said separation means upstream of the hydrocyclone is further arranged to separate solids from the mixture.

7. The drilling fluids system of claim 1 or 2 wherein the drilling fluids are principally comprised of brine and wherein hydrocarbon fluids in the drilling fluids tend to unbalance the weight of the fluids to an undesirable level with respect to pressure in the formations being drilled so that it is necessary to maintain the level of hydrocarbon fluids in the drilling fluids below a level where the weight of the drilling fluids becomes unbalanced with respect to such formation pressures, and further wherein said hydrocyclone is arranged to separate fluids comprising the water component so that the residual oil therein is less than 1000 ppm in the water component outletting from the hydrocyclone.

8. The drilling fluids system of claim 1 or 2 wherein said oil component has excess residual water therein, and further including a second hydrocyclone separator for receiving said oil component from said separation means to further substantially remove such excess residual water.

9. The drilling fluids system of claim 8 wherein said second hydrocyclone has an inlet, an overflow outlet for outletting a clean oil phase from said oil component, and an underflow outlet for outletting a clean water phase.

10. The drilling fluids system of claim 9 and further including tank means upstream of said second hydrocyclone for receiving said oil component from said separation means prior to being received by said second hydrocyclone.

11. The drilling fluids system of claim 10 and further including an outlet flow line connecting with said underflow outlet and having alternate flowpaths for directing underflow from said second hydrocyclone to return to said tank means or to alternate treating means for further separation of components outletting said underflow outlet of said second hydrocyclone; and level control means on said tank means for selectively controlling the overflow between said alternate flowpaths.

12. The drilling fluids system of claim 11 further including a heater treater connected to one of said alternate flowpaths.

13. The drilling fluids system of claim 1 or 2 and further including means for heating fluids in said separation means.

14. The drilling fluids system of claim 1 or 2 wherein said hydrocyclone has an overflow outlet for outletting oil separated from said water component and an underflow outlet for outletting water separated from said water component;

alternate flowpaths for fluids outletting from said underflow outlet, one of said alternate flowpaths being arranged to return fluids to said separation means and the other of said alternate flowpaths being arranged to return fluids to the drilling fluids system for use as a drilling fluid;

level control means on said separation means; and valve means operable in response to said level control means for directing fluids to one of said alternate flowpaths.

15. A method for separating components from a drilling fluids system used for drilling a wellbore into earth formations to produce hydrocarbon fluids therefrom, with the mixture of component materials in the drilling fluids system including drilling fluids, drill cuttings in the form of fluidized particulate matter, and produced hydrocarbon fluids having gas and liquid components and wherein such mixture of component materials emerges from the wellbore under a system pressure which is elevated by the presence of hydrocarbon production from the drilled formation which in turn results in part from a relatively low weight drilling fluid, with improvements in the method for separating the component materials in the mixture to produce a reusable drilling fluid comprising the steps of;

circulating drilling fluids into the wellbore to bring drill cuttings to the surface, such drilling fluids being maintained at a density which will permit hydrocarbon fluids to be expelled under formation pressure into the wellbore to mix with the drilling fluids;

passing the mixture of materials from the wellbore under system pressure into a first stage of separation which is arranged to liberate a substantial portion of the gas component of the produced hydrocarbon and reduce pressure on the drilling fluids system;

upon reduction of pressure on the mixture of materials in the system, passing the remaining materials into a second stage for separating out a substantial portion of fluidized particulate matter in the mixture of materials for discharge therefrom and for separating liquid fluids into oil and water components, with the separated water component having residual oil therein in sufficient quantities to prevent such water component from being further effectively utilized in the drilling fluids system; and passing the water component from the second stage of separation into a hydrocyclone separator for substantially removing such residual oil to thereby outlet a water component which is suitable for reuse as a drilling fluid.

16. The method of claim 15 and further wherein such hydrocyclone includes an inlet means, an overflow outlet for outletting a less dense phase including residual oil separated from such water component and an underflow outlet for outletting substantially clean water separated from said water component, and further including a valve device downstream of said underflow outlet of such hydrocyclone for selectively recycling such clean water to the second stage of separation or passing such clean water to the drilling fluids system for reuse, and selectively operating such valve device in response to changes in the amount of oil and water components in the second stage of separation.

17. The method of claim 15 and further including separating a first portion of fluidized particulate matter from the mixture of materials in the first stage of separation.

18. The method of claim 15 and further including passing the fluidized particulate matter separated from the mixture in the second stage into a centrifugal separator to separate liquid and solid components thereof.

19. The method of claim 15 wherein the drilling fluids are principally comprised of brine and wherein an excess of hydrocarbon fluids in the drilling fluids system tends to unbalance the weight of fluids to an undesirable extent with respect to maintaining a sufficient pressure on the formations being drilled to prevent blowout, and further including maintaining the concentration of hydrocarbon fluids in the drilling fluids system below a level where the weight of the drilling fluids become unbalanced with respect to the presence of formation fluids which are producing into the drilling fluids system.

20. The method of claim 19 and further including maintaining the concentration of the oil component in the drilling fluids system emerging from the hydrocyclone to a level below 1000 PPM.

21. The drilling fluids system of claim 1 or 2 and further including pump means for transferring said water component from said separation means to said hydrocyclone.

22. The drilling fluids system of claim 21 and further including a flowline for transferring said water component from said separation means to said hydrocyclone separator, wherein said pump means is positioned in said flowline.

23. The drilling fluids system of claim 2 and further including downstream separation means for receiving the outletted water component from said hydrocyclone for further separation of components outletting said hydrocyclone.

24. The drilling fluids system of claim 23 wherein said downstream separation means is said separation means for receiving the mixture of materials from the borehole.

25. The method of claim 15 and further including pumping the water component from the second stage of separation into the hydrocyclone separator.

26. A method for separating components from a drilling fluids system used for drilling a wellbore into earth formations to produce hydrocarbon fluids therefrom, with the mixture of component materials in the drilling fluids system including drilling fluids, drill cuttings in the form of fluidized particulate matter, and produced hydrocarbon fluids having gas and liquid components, with improvements in the method for separating the component materials in the mixture to produce a reusable drilling fluid comprising the steps of:
  circulating drilling fluids into the wellbore to bring drill cuttings to the surface, such drilling fluids being maintained at a density which will permit hydrocarbon fluids to be expelled under formation pressure into the wellbore to mix with the drilling fluids;
  passing the mixture of materials from the wellbore under system pressure into a separation system for liberating a substantial portion of the gas component of the produced hydrocarbon and reducing pressure on the drilling fluids system, and for separating liquid fluids into oil and water components, with the separated water component having residual oil therein in sufficient quantities to prevent such water component from being further effectively utilized in the drilling fluids system; and
  passing the water component from said separation system into a hydrocyclone separator for substantially removing such residual oil to thereby outlet a water component which is deoiled to the extent that such water component is suitable for reuse as a drilling fluid.

27. The method of claim 26 and further including passing the outletted water component from said hydrocyclone into a separation device for further separation.

28. The method of claim 26 and further including separating out a portion of said fluidized particulate matter in said separation system receiving materials from the wellbore.

29. The method of claim 28 and further including passing separated particulate matter from said separation system to further separation means downstream of said separation system to separate other of said components from said particulate matter.

* * * * *

UNITED STATES PATENT AND TRADEMARK OFFICE
CERTIFICATE OF CORRECTION

PATENT NO. : 5,129,468
DATED : July 14, 1992
INVENTOR(S) : Allan Scott Parmenter It is certified that error appears in the above-identified patent and that said Letters Patent is hereby corrected as shown below:

Column 2, line 59, "cirtical" should read --critical--.
Column 3, line 19, "object" should read --objects--.

Column 3, line 34, after "further" should insert --separation of the combined components. A water component then--.

Column 4, line 44, "from" should read -- form--.
Column 4, line 49, "soild" should read --solid--.
Column 4, line 54, after "liquid" should insert --level--.

Column 4, line 63, after "valves 14 and 15" should insert --to--.

Column 6, line 8, after "phase" should insert --portion--.
Column 6, line 12, "mixutre" should read --mixture--.
Column 6, line 28, after "fluids" should insert --from--.
Column 6, line 49, delete "at".
Column 6, line 62, after "in" should insert --the--.
Column 6, line 63, after "may" should insert --then--.
Column 6, line 67, "oil" should read --oily--.
Column 7, line 3, after "off" should insert --of--.

UNITED STATES PATENT AND TRADEMARK OFFICE
CERTIFICATE OF CORRECTION

PATENT NO. : 5,129,468
DATED : July 14, 1992
INVENTOR(S) : Allan Scott Parmenter It is certified that error appears in the above-indentified patent and that said Letters Patent is hereby corrected as shown below:

Column 7, line 43, "dsicharging" should read --discharging--.
Col. 10, line 5, "oil" should read --water--.
Col. 10, claim 4, line 7, "water" should read --oil--.

Signed and Sealed this

Third Day of August, 1993

Attest:

MICHAEL K. KIRK

Attesting Officer  Acting Commissioner of Patents and Trademarks